(12) United States Patent
Ruan

(10) Patent No.: US 12,266,955 B2
(45) Date of Patent: Apr. 1, 2025

(54) BATTERY SYSTEM AND PARALLELIZATION METHOD AND APPARATUS THEREOF

(71) Applicant: RoyPow Technology Co., Ltd., Guangdong (CN)

(72) Inventor: Tingjun Ruan, Huizhou (CN)

(73) Assignee: RoyPow Technology Co., Ltd., Huizhou (CN)

( * ) Notice: Subject to any disclaimer, the term of this patent is extended or adjusted under 35 U.S.C. 154(b) by 640 days.

(21) Appl. No.: 17/559,225

(22) Filed: Dec. 22, 2021

(65) Prior Publication Data
US 2023/0083686 A1    Mar. 16, 2023

(30) Foreign Application Priority Data
Sep. 13, 2021   (CN) .......................... 202111069981.1

(51) Int. Cl.
*H02J 7/00*    (2006.01)
(52) U.S. Cl.
CPC ........ *H02J 7/0024* (2013.01); *H02J 7/00032* (2020.01); *H02J 7/0019* (2013.01); *H02J 7/0063* (2013.01); *H02J 7/007182* (2020.01)
(58) Field of Classification Search
CPC ........ H02J 3/381; H02J 1/102; H02J 2300/24; H02J 3/46; H02J 7/35; H02J 3/38; H02J 2310/48; H02J 7/0024; H02J 2300/26; H02J 7/0013; H02J 7/007192; H02J 13/00001; H02J 13/00004; H02J 13/00026; H02J 2310/12; H02J 2310/60; H02J 3/14; H02J 3/388; H02J 7/00304; H02J 7/0047; H02J 7/0068; H02J 2300/30; H02J 3/18; H02J 7/0016; H02J 7/00306; H02J 7/0063; H02J 1/106; H02J 1/12; H02J 2207/20; H02J 2310/22; H02J 2310/40; H02J 7/00;
(Continued)

(56) References Cited

U.S. PATENT DOCUMENTS

| 2019/0214832 A1* | 7/2019 | Li .......................... H02J 7/0024 |
| 2019/0214833 A1* | 7/2019 | Li ......................... H02J 7/00718 |
| 2021/0135478 A1* | 5/2021 | Schline ................. G06F 1/3212 |

FOREIGN PATENT DOCUMENTS

| CN | 106712202 A | 5/2017 |
| CN | 110797924 A | 2/2020 |
| CN | 112151887 A | 12/2020 |

OTHER PUBLICATIONS

Chinese Patent Office: First Office Action of CN 202111069981.1 (related application); Jul. 8, 2022; 14 pages.

* cited by examiner

*Primary Examiner* — Binh C Tat

(57) ABSTRACT

The present application relates to a battery system and a parallelization method and apparatus thereof. The parallelization method of the battery system includes: acquiring voltages of the battery packs respectively; setting a charging priority of each of the battery packs according to a preset rule and the voltages of the battery packs; and controlling the switching circuit corresponding to the battery pack in the highest charging priority to be turned on to connect a charging loop of the battery pack for charging, and if the voltage of the battery pack currently charged is increased to a value close to the voltage of the battery pack in a next charging priority, controlling the switching circuit corresponding to the battery pack in the next charging priority to be turned on.

10 Claims, 6 Drawing Sheets

(58) Field of Classification Search
CPC ............... H02J 7/00036; H02J 7/00047; H02J 7/00718; H02J 7/007184; H02J 7/02; H02J 7/00032; H02J 7/0019; H02J 7/0042; H02J 7/0044; H02J 7/007; H02J 7/007182; H02J 7/007194; H02J 7/1423; H02J 7/342; H02J 7/345; H02J 7/0018; H02J 7/0031; H02J 7/00034; H02J 7/0025; H02J 7/00302; H02J 7/00714; H02J 7/04; G01R 31/392; G01R 31/382; G01R 31/367; G01R 19/16542; Y02T 10/70; Y02T 10/64
USPC .................................. 320/116–122, 116–132
See application file for complete search history.

BATTERY SYSTEM AND PARALLELIZATION METHOD AND APPARATUS THEREOF

CROSS-REFERENCE TO RELATED APPLICATIONS

The present application claims priority to Chinese patent application No. 2021110699811, entitled BATTERY SYSTEM AND PARALLELIZATION METHOD AND APPARATUS, filed on Sep. 13, 2021, the specification of which is incorporated herein by reference in its entirety.

TECHNICAL FIELD

The present application relates to the field of battery technologies, and in particular, to a battery system, a parallelization method and apparatus thereof, and a computer-readable storage medium.

BACKGROUND

A battery pack is formed by a plurality of cells connected in series. Sometimes, one battery pack is insufficient to meet requirements for battery output power. A plurality of battery packs may be connected in parallel to provide electric energy for a load to increase the power.

However, since the battery packs are formed after the plurality of cells are connected in series, voltage differences may exist between the battery packs. A loop current may be generated between different battery packs the moment the battery packs are connected in parallel. When batteries are at a low temperature, the formed loop current, if charging the batteries, may cause irreversible damages to the batteries. At the same time, if the loop current is too high, the batteries and corresponding connecting circuits may be overheated, resulting in safety accidents.

SUMMARY

In view of the above, there is a need to provide, with respect to the above technical problems, a battery system, a parallelization method and apparatus thereof, and a computer-readable storage medium that can reduce a loop current during parallelization of a plurality of battery packs.

In one aspect, embodiments of the present disclosure provide a parallelization method of the battery system, wherein the battery system includes a plurality of battery pack modules, each of the battery pack modules includes a battery pack and a switching circuit, the switching circuit is configured to be connected in series between a charging power supply and the battery pack, and the parallelization method includes: acquiring voltages of the battery packs respectively; setting a charging priority of each of the battery packs according to a preset rule and the voltages of the battery packs; wherein the preset rule is voltage differences between the battery packs in a same charging priority being less than a preset value and the voltage of the battery pack in a low charging priority being higher than that of the battery pack in a high charging priority; and controlling the switching circuit corresponding to the battery pack in the highest charging priority to be turned on to connect a charging loop of the battery pack for charging, and if the voltage of the battery pack currently charged is increased to a value close to the voltage of the battery pack in a next charging priority, controlling the switching circuit corresponding to the battery pack in the next charging priority to be turned on, so that the battery pack in the next charging priority is connected in parallel to the charging loop for being charged until all the battery packs are connected in parallel to the charging loop for being charged.

In another aspect, the embodiments of the present disclosure provide a battery system, including: a plurality of battery pack modules, each of the battery pack modules including a battery pack and a switching circuit, and the switching circuit being configured to be connected in series between a charging power supply and the battery pack; and a control apparatus connected to the battery packs and the switching circuits, configured to acquire voltages of the battery packs respectively, configured to set a charging priority of each of the battery packs according to a preset rule and the voltages of the battery packs, and further configured to control the switching circuit corresponding to the battery pack in the highest charging priority to be turned on to connect a charging loop of the battery pack for charging, and if the voltage of the battery pack currently charged is increased to a value close to the voltage of the battery pack in a next charging priority, control the switching circuit corresponding to the battery pack in the next charging priority to be turned on, so that the battery pack in the next charging priority is connected in parallel to the charging loop for being charged until all the battery packs are connected in parallel to the charging loop for being charged; wherein the preset rule is voltage differences between the battery packs in a same charging priority being less than a preset value and the voltage of the battery pack in a low charging priority being higher than that of the battery pack in a high charging priority.

In one embodiment, the control apparatus includes a plurality of battery management systems, the battery management systems are connected through a data bus, the battery management systems are in one-to-one correspondence to the battery pack modules, and each of the battery management systems is configured to acquire the voltage of the corresponding battery pack and control the corresponding switching circuit to be turned on or turned off; and states of the battery management systems include a master state and a slave state; wherein when any one of the battery management systems is in the master state, the rest of the battery management systems are in the slave state, and the battery management system in the master state is configured to set a charging priority of each of the battery packs according to a preset rule and the voltages of the battery packs, and configured to control the switching circuit corresponding to the battery pack in the highest charging priority to be turned on to connect a charging loop of the battery pack for charging, and if the voltage of the battery pack currently charged is increased to a value close to the voltage of the battery pack in a next charging priority, control the switching circuit corresponding to the battery pack in the next charging priority to be turned on, so that the battery pack in the next charging priority is connected in parallel to the charging loop for being charged until all the battery packs are connected in parallel to the charging loop for being charged; wherein the preset rule is voltage differences between the battery packs in a same charging priority being less than a preset value and the voltage of the battery pack in a low charging priority being higher than that of the battery pack in a high charging priority.

In one embodiment, each of the battery management systems is provided with a switching port, the battery system further includes an activation switch, the activation switch is connected in series with the switching ports of the battery management systems, and the activation switch is configured to activate the battery management systems when in a first state.

In one embodiment, the battery management system is configured to transmit its own device code to the rest of the battery management systems through the data bus, and further configured to be in the master state when its own device code is minimum and be in the slave state otherwise.

In one embodiment, the battery management system in the master state is configured to control the charging power supply to stop charging when the voltages of all the battery packs are increased to a preset voltage, so that the battery packs form a discharge loop with an external load through the corresponding switching circuits when the external load is connected.

In one embodiment, states of the activation switch further include a second state, and the battery management system in the master state is configured to acquire currents of the battery packs respectively when the activation switch is in the second state, determine that the external load has been disconnected when a sum of the currents of the battery packs is less than a first preset current value, and control all the switching circuits to be turned off and all the battery management systems to sleep when an absolute value of the sum of the currents of the battery packs is less than a second preset current value.

In one embodiment, the charging power supply and the battery management systems are connected through the data bus, the charging power supply is configured to transmit an online message to the battery management systems, and the battery management system in the master state, when receiving the online message, determines that the charging power supply is connected.

In one embodiment, the switching circuits are relays.

In yet another aspect, the embodiments of the present disclosure provide a parallelization apparatus of the battery system, wherein the battery system includes a plurality of battery pack modules, each of the battery pack modules includes a battery pack and a switching circuit, the switching circuit is configured to be connected in series between a charging power supply and the battery pack, and the parallelization apparatus includes: a voltage acquisition module configured to acquire voltages of the battery packs respectively; a charging priority determination module configured to set a charging priority of each of the battery packs according to a preset rule and the voltages of the battery packs; wherein the preset rule is voltage differences between the battery packs in a same charging priority being less than a preset value and the voltage of the battery pack in a low charging priority being higher than that of the battery pack in a high charging priority; and a charging control module configured to control the switching circuit corresponding to the battery pack in the highest charging priority to be turned on to connect a charging loop of the battery pack for charging, and if the voltage of the battery pack currently charged is increased to a value close to the voltage of the battery pack in a next charging priority, control the switching circuit corresponding to the battery pack in the next charging priority to be turned on, so that the battery pack in the next charging priority is connected in parallel to the charging loop for being charged charging until all the battery packs are connected in parallel to the charging loop for being charged.

In still another aspect, the embodiments of the present application further provide a computer-readable storage medium, storing a computer program thereon, wherein when the computer program is executed by a processor, steps of the parallelization method of a battery system as described above are performed.

Based on any one of the above embodiments, the charging priorities are set for the battery packs according to magnitude of the voltages of the battery packs in the battery system and the preset rule, and the battery packs connected in parallel at the same time without generating an unsafe loop current are set to a same charging priority, so that they may be connected in parallel to the charging loop at the same time. When the battery pack with a lower voltage, after being charged, has a voltage gradually approaching that of the battery pack in a next charging priority, the battery pack in the next charging priority is also connected in parallel. Finally, all the battery packs are gradually connected in parallel to complete the parallelization process. A voltage difference between each parallel battery pack newly to be connected in parallel and an existing parallel battery pack that has been connected in parallel is within the preset value, which greatly reduces a loop current during parallelization of the battery packs, ensures safety and reliability of the parallelization process, and completes the parallelization process efficiently and quickly.

BRIEF DESCRIPTION OF THE DRAWINGS

In order to more clearly illustrate the technical solutions in the embodiments of the present application or the conventional art, the accompanying drawings used in the description of the embodiments or the conventional art will be briefly introduced below. It is apparent that, the accompanying drawings in the following description are only some embodiments of the present application, and other drawings can be obtained by those of ordinary skill in the art from the provided drawings without creative efforts.

DETAILED DESCRIPTION

Figure 1:
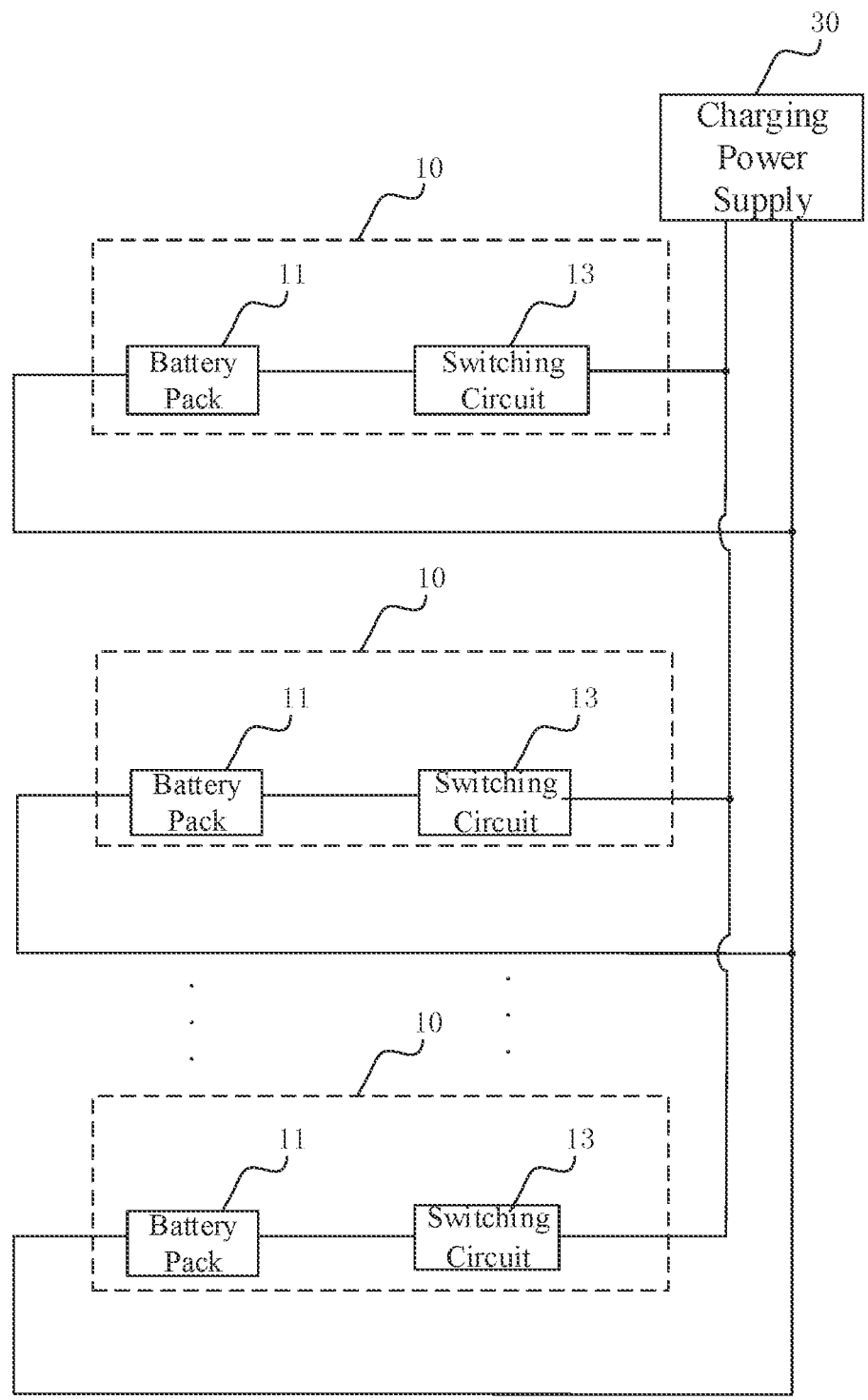
FIG. 1 is a schematic structural diagram of a battery system according to an embodiment.

To facilitate understanding of the present application, a more comprehensive description of the present application will be given below with reference to the relevant accompanying drawings. Embodiments of the present application are given in the drawings. However, the present application may be implemented in many different forms and is not limited to the embodiments described herein. Rather, these embodiments are provided to make the contents disclosed in the present application more fully understood.

Unless defined otherwise, all technical and scientific terms used herein have the same meanings as would generally understood by those skilled in the technical field of the present application. The terms used herein in the specification of the present application are for the purpose of describing specific embodiments only, and are not intended to limit the present application.

It may be understood that, the terms such as "first" and "second" used in the present application may be used herein to describe various elements, but the elements are not limited to these terms. These terms are used only to distinguish the first element from another element.

Spatial relationship terms such as "under", "underneath", "below", "beneath", "over", and "above" may be used herein to describe a relationship between one element or feature and another element or feature illustrated in the figures. It should be understood that, in addition to the orientations illustrated in the figures, the spatial relationship terms are intended to further include different orientations of the device in use and operation. For example, if the device in the figures is flipped, the element or feature described as "below", "underneath" or "under" another element or feature may be oriented as "on" the another element or feature. Thus, the exemplary terms "below" and "under" may include two orientations of above and below. In addition, the device may include additional orientations (e.g., 90-degree rotation or other orientations), and thus spatial descriptors used herein may be interpreted accordingly.

It is to be noted that, when one element is considered to be "connected to" another element, it may be directly connected to the another element or be connected to the another element through an intermediate element. In addition, "connection" in the following embodiments should be understood as "electrical connection", "communication connection" or the like if an electrical signal or data is transmitted between connected objects.

In use, the singular forms of "a/an", "one", and "/the" may also include plural forms, unless otherwise clearly specified by the context. It should be further understood that the term "include/comprise" or "have" specify the presence of the features, integers, steps, operations, components, portions, or their combinations, but may not exclude the presence or addition of one or more of other features, integers, steps, operations, components, portions, or their combinations. At the same time, the term "and/or" used in the specification may include any and all combinations of related listed items.

Figure 2:
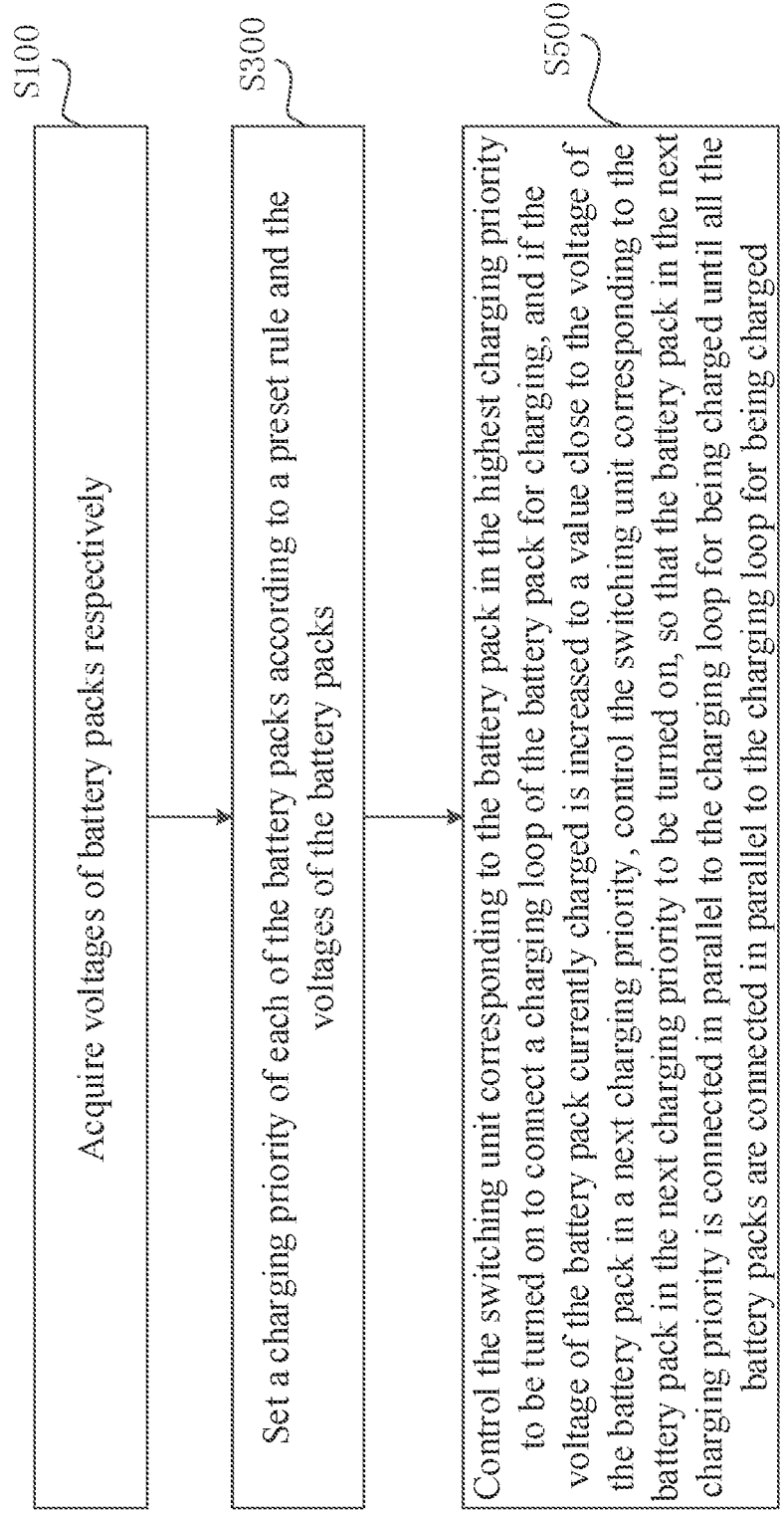
FIG. 2 is a schematic flowchart of a parallelization method of a battery system according to an embodiment.

A parallelization method of a battery system according to the present application may be applied to a battery system shown in FIG. 1. The battery system includes a plurality of battery pack modules 10. The battery pack modules each include a battery pack 11 and a switching circuit 13. The switching circuit 13 is configured to be connected in series between a charging power supply 30 and the battery pack 11. As shown in FIG. 2, the parallelization method of a battery system includes step S100 to step S500.

In S100, voltages of the battery packs are respectively acquired.

In S300, a charging priority of each of the battery packs is set according to a preset rule and the voltages of the battery packs.

The preset rule is voltage differences between the battery packs in a same charging priority being less than a preset value and the voltage of the battery pack in a low charging priority being higher than that of the battery pack in a high charging priority. It may be understood that the charging priorities indicate an order in which the battery packs are connected in parallel. The battery pack in a higher charging priority is connected in parallel for being charged earlier. A plurality of battery packs may be in a same charging priority. However, when a voltage difference between one battery pack and all the other battery packs is greater than the preset value, this battery pack is in a charging priority alone. When a plurality of battery packs are in the same charging priority, magnitude of a loop current generated at the moment when the plurality of battery packs are connected in parallel at the same time is positively correlated with magnitude of voltage differences between the battery packs connected in parallel at the same time. When the voltage differences between the plurality of battery packs are all less than the preset value, the loop current between the battery packs has little impact and will not affect the safety of the battery packs connected in parallel at the same time. In addition, after the battery pack is connected to a charging loop for being charged, its voltage may increase. The battery pack with a lower voltage is in a higher charging priority and is charged first, so that the voltage difference between the battery pack in a low charging priority and the battery pack in a high charging priority may be gradually reduced. This embodiment does not limit the implementation of the setting of the charging priorities, provided that the set charging priorities can meet the above preset rule. The preset value may be set according to magnitude of the loop current that the battery packs can withstand, industry safety regulations, and so on. If parallelization basically without any loop current is required, the preset value may be set to a relatively small value, so as to achieve an effect of connecting the battery packs in parallel only when a voltage difference between the battery pack that has been not connected in parallel and the battery pack that has been connected in parallel is minimum.

In S500, the switching circuit corresponding to the battery pack in the highest charging priority is controlled to be turned on to connect a charging loop of the battery pack for charging, and if the voltage of the battery pack currently charged is increased to a value close to the voltage of the battery pack in a next charging priority, the switching circuit corresponding to the battery pack in the next charging priority is controlled to be turned on, so that the battery pack in the next charging priority is connected in parallel to the charging loop for being charged until all the battery packs are connected in parallel to the charging loop for being charged.

It may be understood that after the switching circuit corresponding to the battery pack is turned on, the charging power supply, the switching circuit and the battery pack form a charging loop, and the charging power supply charges the battery pack. As the charging proceeds, the voltage of the battery pack in the highest charging priority is gradually increased to a value close to ("close to" may mean that the voltage difference is less than the preset value) the voltage of the battery pack in the next charging priority. In this case, impact of the loop current generated by parallel connection of the battery pack in the next charging priority to the charging loop on the battery pack has been greatly reduced. Then, the battery packs in various charging priorities are sequentially connected to the charging loop in parallel according to the charging priorities. Finally, all the battery packs are connected in parallel, which means that the parallelization process of the battery system is completed.

Based on the parallelization method of a battery system according to this embodiment, the charging priorities are respectively set for the battery packs according to magnitude of the voltages of the battery packs in the battery system and the preset rule, and the battery packs connected in parallel at the same time without generating an unsafe loop current are set to a same charging priority, so that they may be connected in parallel to the charging loop at the same time. When the battery pack with a lower voltage, after being charged, has a voltage gradually approaching that of the battery pack in a next charging priority, the battery pack in the next charging priority is also connected in parallel. Finally, all the battery packs are gradually connected in parallel to complete the parallelization process. A voltage difference between each parallel battery pack newly to be connected in parallel and an existing parallel battery pack that has been connected in parallel is within the preset value, which greatly reduces a loop current during parallelization of the battery packs, ensures safety and reliability of the parallelization process, and completes the parallelization process efficiently and quickly.

Figure 3:
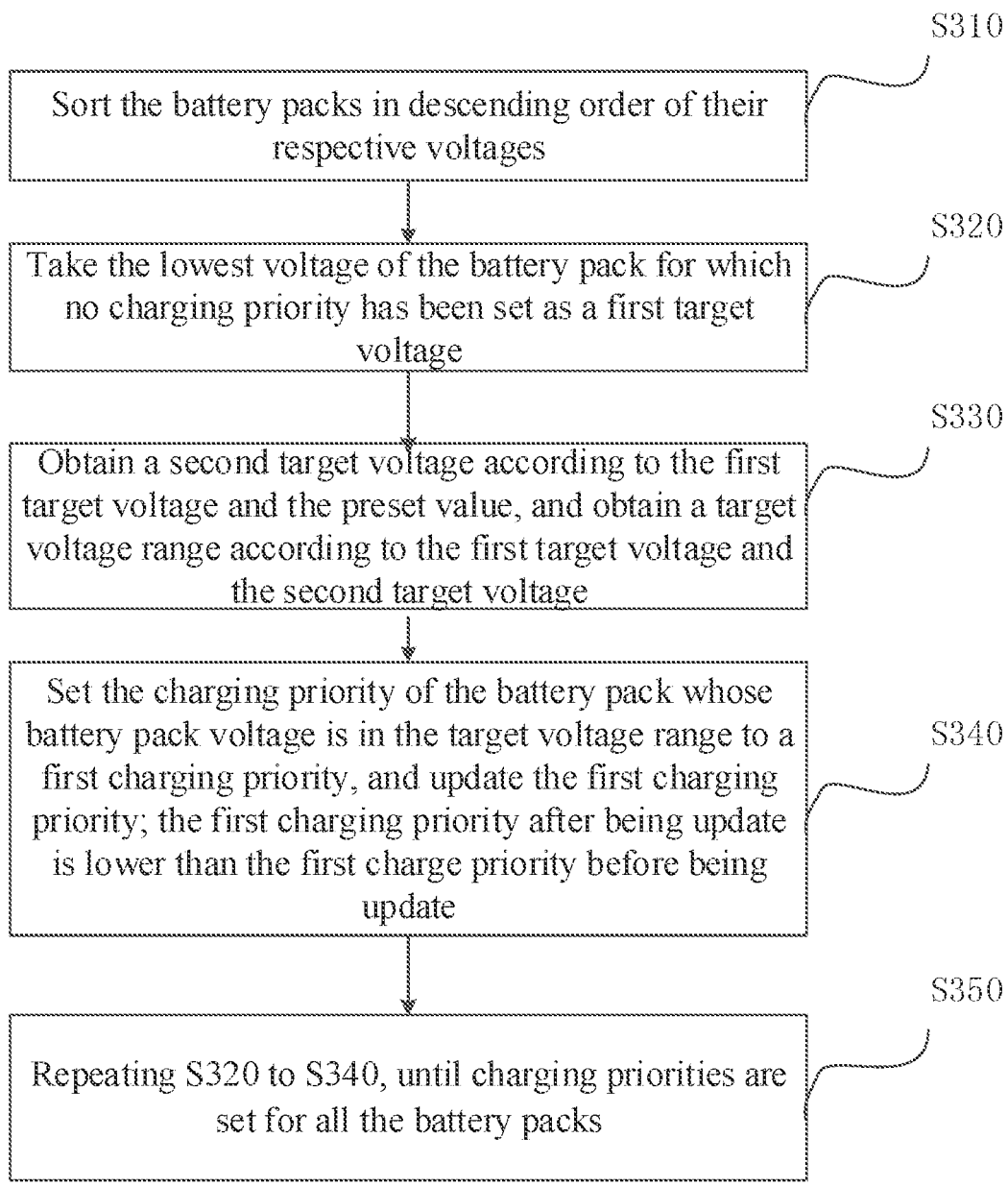
FIG. 3 is a schematic flowchart of setting charging priorities according to an embodiment.

In a specific embodiment, as shown in FIG. 3, step S300 may be step S310 to step S350.

In S310, the battery packs are sorted in descending order of their respective voltages.

In S320, the lowest voltage of the battery pack for which no charging priority has been set is taken as a first target voltage.

In S330, a second target voltage is obtained according to the first target voltage and the preset value, and a target voltage range is obtained according to the first target voltage and the second target voltage.

Specifically, the second target voltage may be a sum of the first target voltage and the preset value. The first target voltage is a lower limit of the target voltage range, and the second target voltage is an upper limit of the target voltage range. Therefore, a voltage difference between the battery packs in a same target voltage range may not exceed the preset value.

In S340, the charging priority of the battery pack whose battery pack voltage is in the target voltage range is set to a first charging priority, and the first charging priority is updated. The first charging priority after being updated is lower than the first charge priority before being updated.

Corresponding first charge priorities may be set for all target voltage ranges determined by different first target voltages and second target voltages. The first target voltage selected each time is the lowest voltage of the battery pack for which no charging priority is set. Therefore, the first target voltage selected first is lower than the first target voltage selected later, so that the target voltage range corresponding to the first target voltage selected later is larger than the target voltage range corresponding to the first target voltage selected first. At the same time, since the first charging priority set for the target voltage range corresponding to the first target voltage selected later is lower, a voltage of the battery pack in the low charge priority is higher than that of the battery pack in the high charge priority.

In S350, steps S320 to S340 are repeated, until charging priorities are set for all the battery packs.

Figure 4:
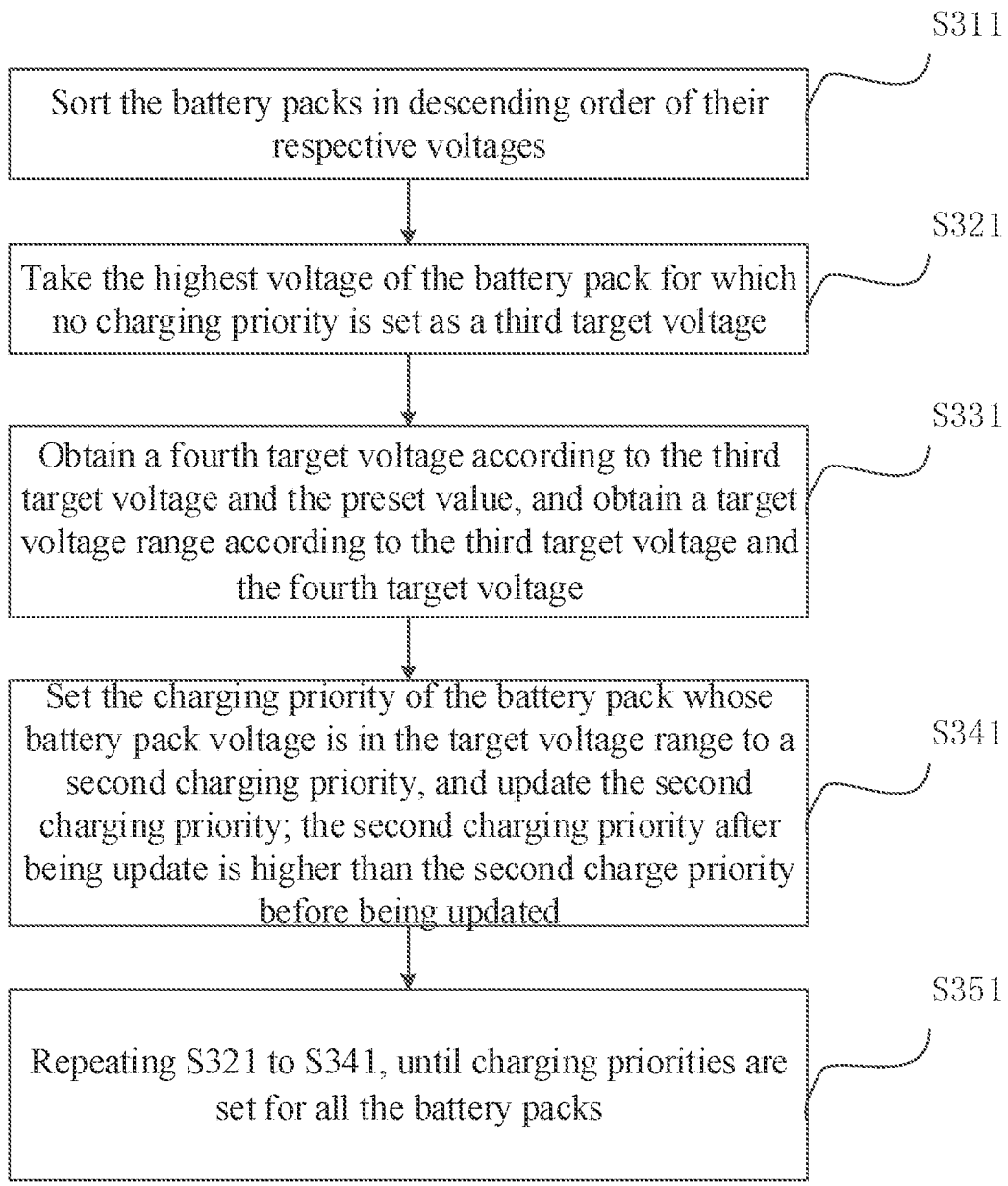
FIG. 4 is a schematic flowchart of setting charging priorities according to another embodiment.

Similarly, in a specific embodiment, as shown in FIG. 4, step S300 may also be step S311 to step S351.

In S311, the battery packs are sorted in descending order of their respective voltages.

In S321, the highest voltage of the battery pack for which no charging priority has been set is taken as a third target voltage.

In S331, a fourth target voltage is obtained according to the third target voltage and the preset value, and a target voltage range is obtained according to the third target voltage and the fourth target voltage.

Specifically, the fourth target voltage may be a sum of the third target voltage and the preset value. The third target voltage is an upper limit of the target voltage range, and the fourth target voltage is a lower limit of the target voltage range. Therefore, a voltage difference between the battery packs in a same target voltage range may not exceed the preset value.

In S341, the charging priority of the battery pack whose battery pack voltage is in the target voltage range is set to a second charging priority, and the second charging priority is updated. The second charging priority after being updated is higher than the second charge priority before being updated.

Corresponding second charge priorities may be set for all target voltage ranges determined by different third target voltages and fourth target voltages. The third target voltage selected each time is the highest voltage of the battery pack for which no charging priority is set. Therefore, the third target voltage selected first is higher than the third target voltage selected later, so that the target voltage range corresponding to the third target voltage selected later is smaller than the target voltage range corresponding to the third target voltage selected first. At the same time, since the second charging priority set for the target voltage range corresponding to the third target voltage selected later is higher, a voltage of the battery pack in the low charge priority is higher than that of the battery pack in the high charge priority.

In S351, steps S321 to S341 are repeated, until charging priorities are set for all the battery packs.

It is to be understood that, although the steps in the flowcharts of FIG. 2 to FIG. 4 are displayed in sequence as indicated by the arrows, the steps are not necessarily performed in the order indicated by the arrows. Unless otherwise clearly specified herein, the steps are performed without any strict sequence limitation, and may be performed in other orders. In addition, at least some steps in FIG. 2 to FIG. 4 may include a plurality of steps or a plurality of stages, and such steps or stages are not necessarily performed at a same moment, and may be performed at different moments. The steps or stages are not necessarily performed in sequence, and the steps or stages and at least some of other steps or steps or stages of other steps may be performed in turn or alternately.

Still referring to FIG. 1, an embodiment of the present disclosure provides a battery system. The battery system includes a control apparatus (not shown in the figure) and a plurality of battery pack modules 10. The battery pack modules 10 each include a battery pack 11 and a switching circuit 13. The switching circuit 13 is configured to be connected in series between a charging power supply 30 and the battery pack 11.

The control apparatus is connected to the battery packs 11 and the switching circuits 13. The control apparatus is configured to acquire voltages of the battery packs 11 respectively, and is configured to set a charging priority of each of the battery packs 11 according to a preset rule and the voltages of the battery packs 11, and is further configured to control the switching circuit 13 corresponding to the battery pack 11 in the highest charging priority to be turned on to connect a charging loop of the battery pack 11 for charging, and if the voltage of the battery pack 11 currently charged is increased to a value close to the voltage of the battery pack 11 in a next charging priority, control the switching circuit 13 corresponding to the battery pack 11 in the next charging priority to be turned on, so that the battery pack 11 in the next charging priority is connected in parallel to the charging loop for being charged until all the battery packs 11 are connected in parallel to the charging loop for charging The preset rule is voltage differences between the battery packs 11 in a same charging priority being less than a preset value and the voltage of the battery pack 11 in a low charging priority being higher than that of the battery pack 11 in a high charging priority.

Based on the battery system according to this embodiment, the charging priorities are respectively set for the battery packs according to magnitude of the voltages of the battery packs in the battery system and the preset rule, and the battery packs connected in parallel at the same time without generating an unsafe loop current are set to a same charging priority, so that they may be connected in parallel to the charging loop at the same time. When the battery pack with a lower voltage, after being charged, has a voltage gradually approaching that of the battery pack in a next charging priority, the battery pack in the next charging priority is also connected in parallel. Finally, all the battery packs are gradually connected in parallel to complete the parallelization process. A voltage difference between each parallel battery pack newly to be connected in parallel and an existing parallel battery pack that has been connected in parallel is within the preset value, which ensures safety and reliability of the parallelization process, and completes the parallelization process efficiently and quickly.

In one embodiment, the control apparatus may include a separate controller. The controller includes a memory and a processor. The memory stores a computer program. When the computer program is executed by the processor, functions of the control apparatus in the previous embodiment are implemented.

Figure 5:
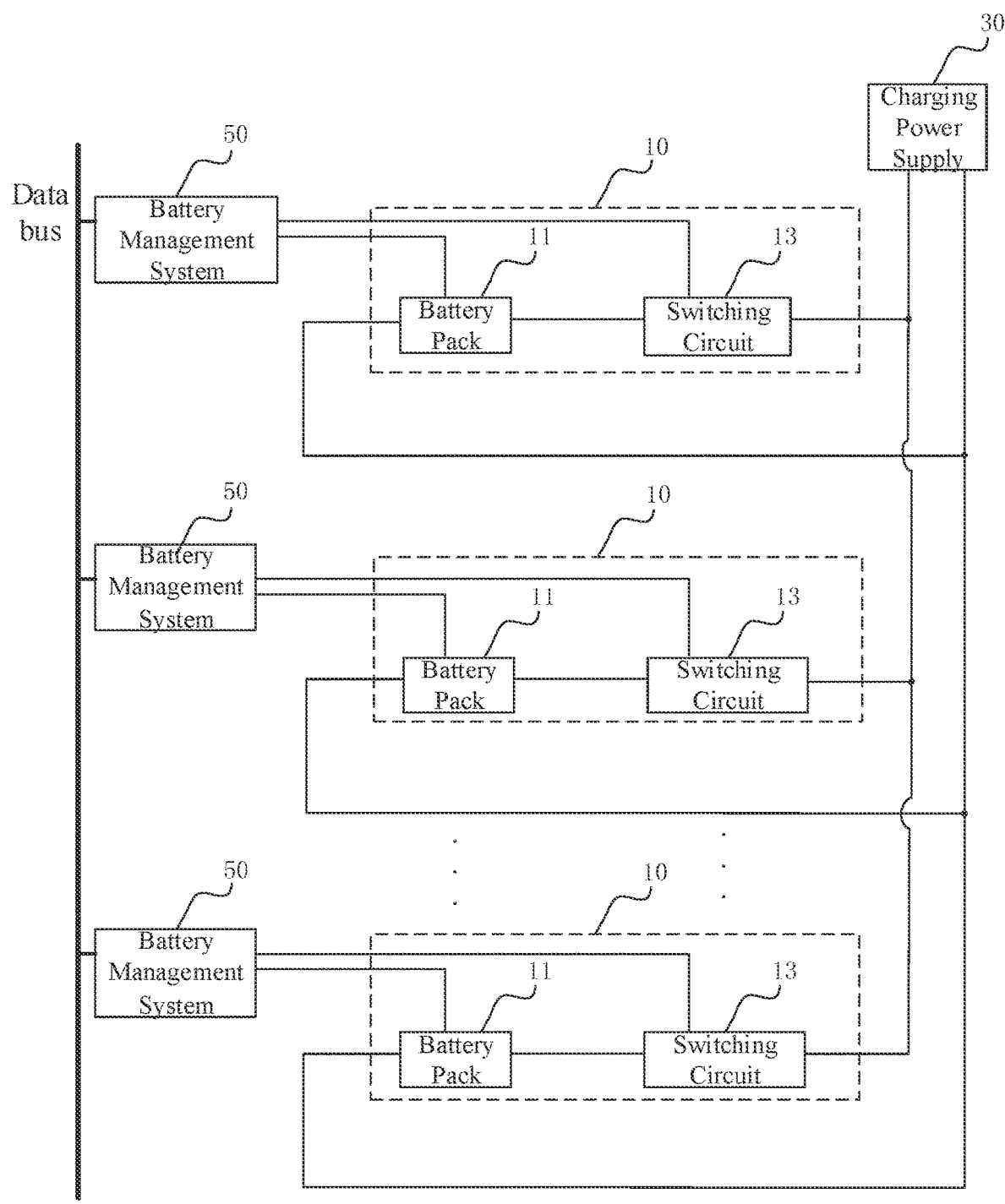
FIG. 5 is a schematic structural diagram of a battery system according to another embodiment.

However, the manner in the previous embodiment may be limited by a number of ports of the controller, resulting in insufficient flexibility to expand in the case of a large number of battery packs 11. In consideration of the fact that the current research on a battery management system 50 is relatively mature, in one embodiment, the control apparatus includes a plurality of battery management systems 50, as shown in FIG. 5. The battery management systems 50 are connected through a data bus. The battery management systems 50 are in one-to-one correspondence to the modules of the battery packs 11. Each of the battery management systems 50 acquires the voltage of the corresponding battery pack 11 and control the corresponding switching circuit 13 to be turned on or turned off. States of the battery management systems 50 include a master state and a slave state. When any one of the battery management systems 50 is in the master state, the rest of the battery management systems 50 are in the slave state.

The battery management system 50 in the master state is configured to acquire voltages of the corresponding battery packs 11 fed back by the battery management systems 50 in the slave state. The battery management system 50 in the master state, after acquiring the voltage of the battery pack 11 corresponding thereto, may also obtain, from the data bus, the voltages of the battery packs 11 collected by other battery management systems 50 in the slave state.

The battery management system 50 in the master state is further configured to set the charging priority of each of the battery packs 11 according to a preset rule and the voltages of the battery packs 11. The preset rule is voltage differences between the battery packs 11 in a same charging priority being less than a preset value and the voltage of the battery pack 11 in a low charging priority being higher than that of the battery pack 11 in a high charging priority.

The battery management system 50 in the master state is further configured to control the switching circuit 13 corresponding to the battery pack 11 in the highest charging priority to be turned on to connect a charging loop of the battery pack 11 for charging, and if the voltage of the battery pack 11 currently charged is increased to a value close to the voltage of the battery pack 11 in a next charging priority, control the switching circuit 13 corresponding to the battery pack 11 in the next charging priority to be turned on, so that the battery pack 11 in the next charging priority is connected in parallel to the charging loop for being charged until all the battery packs 11 are connected in parallel to the charging loop for being charged. Specifically, the battery management system 50 in the master state transmits a control command, through the data bus, to the battery management system 50 corresponding to the switching circuit 13 to be turned on, so as to instruct the battery management system 50 to control the corresponding switching circuit 13 to be turned on.

In one embodiment, the battery management system is incorporated into the corresponding battery pack module to be combined into a whole. Use of the whole product may greatly improve versatility of the battery pack and be more flexible in expansion. After combination, the battery pack module is provided with a data bus port. The battery management systems of the battery pack modules are connected to the data bus through the data bus ports, so as to realize communication between the battery management systems.

In one embodiment, the battery management system is provided with a switching port, the battery system further includes an activation switch, the activation switch is connected in series with the switching ports of the battery management systems, and the activation switch is configured to activate the battery management systems when in a first state. Specifically, the battery management system, after being activated, may check whether any other battery management systems exist based on message transmitted over the data bus, so as to determine whether a single battery pack operates independently or a plurality of battery packs operate in parallel. When a single battery pack operates independently, the battery management system may directly control the corresponding switching circuit to be turned on. If a user activates the battery packs one by one when the battery packs need to be operated in parallel, the battery management system may misjudge the operation mode, and control the corresponding switching circuit to be turned on. The direct control over the corresponding switching circuit enables the battery packs with voltage differences to also be connected in parallel at the same time, resulting in a large loop current. Therefore, the activation switch activates the corresponding battery management systems of all the battery packs collectively, so as to prevent the above situation. The switching port may also be arranged on the whole after the battery pack module is combined with the battery management system in the above embodiment.

In one embodiment, the battery management system is configured to transmit its own device code to the rest of the battery management systems through the data bus, and further configured to be in the master state when its own device code is minimum and be in the slave state otherwise. Further, the battery management system is further configured to transmit its own failure to the rest of the battery management systems through the data bus, and further configured to be in the master state when its own device code is minimum in the battery management system without failure and be in the slave state otherwise. If a current battery management system in the master state fails, the master may be transferred to another battery management system, so that the battery management system can still continue to operate.

In one embodiment, the charging power supply and the battery management systems are connected through the data bus, the charging power supply is configured to transmit an online message to the battery management systems, and the battery management system in the master state, when receiving the online message, determines that the charging power supply is connected.

In one embodiment, the battery management system in the master state is configured to control the charging power supply to stop charging when the voltages of all the battery packs are increased to a preset voltage, so that the battery packs form a discharge loop with an external load through the corresponding switching circuits when the external load is connected. When the voltages of all the battery packs are increased to the preset voltage, it means that electric energy stored in the battery packs is sufficient to power the external load. The battery management system in the master state may issue a charging stop command to the charging power supply through the data bus. In this case, if an external load is connected to a power system, each battery pack in the battery system supplies power to the external load through the corresponding switching circuit. Turn-on and turn-off of the discharge loop and the charging loop of the battery packs are controlled by corresponding switching circuits, which simplifies circuit design and reduces circuit costs. In a specific embodiment, the whole after the battery pack module is combined with the battery management system is further provided with an input/output port. The input/output port is configured to be connected between each switching circuit and the charging power supply and/or the external load.

In one embodiment, states of the activation switch further include a second state. When the activation switch is in the second state, it indicates that the power supply of the battery system is no longer required by the user, and the battery packs may be disconnected and the battery management systems corresponding to the battery packs may sleep. The battery management system in the master state is configured to acquire currents of the battery packs respectively when the activation switch is in the second state, and determine that the external load has been disconnected when a sum of the currents of the battery packs is less than a first preset current value. It may be understood that according to Kirchhoff's current law, when the sum of the currents of the battery packs is less than the first preset current value, it means that the currents only flow between the battery packs, and the currents of the battery packs do not flow to the external load. Therefore, it may be determined that the external load has been disconnected. However, when the loop current between the battery packs is large, it is not suitable to turn off the switching circuits of the battery packs directly, magnitude of the loop current between the battery packs may be determined according to an absolute value of the sum of the currents of the battery packs. Therefore, all the switching circuits are controlled to be turned off and all the battery management systems are controlled to sleep only when the absolute value of the sum of the currents of the battery packs is less than a second preset current value.

Upon research, the inventor finds that in the conventional art, MOS transistors are always used as total output and current limiting charging circuits of the battery packs, which can effectively prevent the influence of the loop current at the moment of parallel connection when the battery packs are connected in parallel, but cannot output high power for a long time due to limitations of inherent internal resistance of the MOS transistors. At the same time, parallel connection of a plurality of MOS transistors also results in high costs. Therefore, in one embodiment, the switching circuits are selected as relays. It may be understood that, since the internal contact resistance of the relay is close to 0, the battery pack may discharge at high power for a long time.

In one embodiment, the data bus is a CAN bus.

Figure 6:
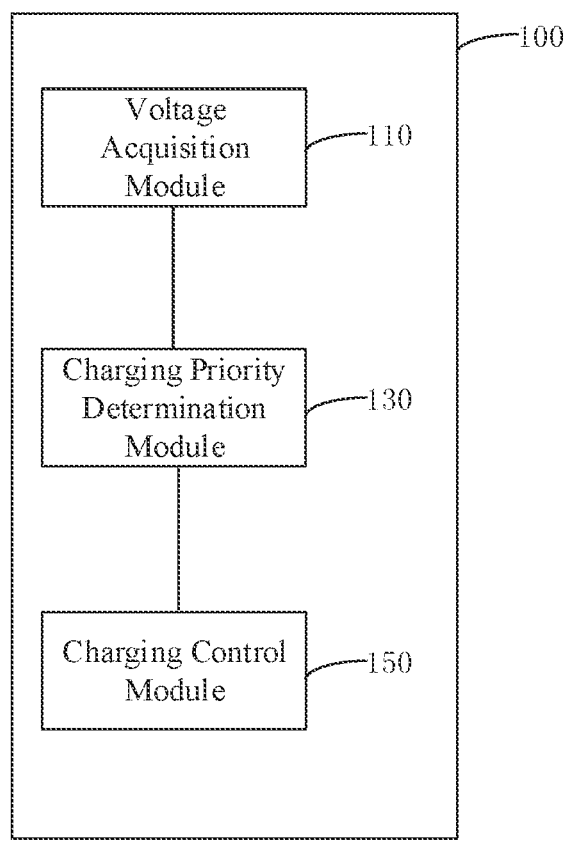
FIG. 6 is a schematic structural diagram of a parallelization apparatus of a battery system according to an embodiment.

An embodiment of the present disclosure further provides a parallelization apparatus of a battery system. The battery system includes a plurality of battery pack modules. The battery pack modules each include a battery pack and a switching circuit. The switching circuit is configured to be connected in series between a charging power supply and the battery pack. As shown in FIG. 6, the parallelization apparatus 100 of a battery system includes a voltage acquisition module 110, a charging priority determination module 130 and a charging control module 150. The voltage acquisition module 110 is configured to acquire voltages of the battery packs respectively. The charging priority determination module 130 is configured to set a charging priority of each of the battery packs according to a preset rule and the voltages of the battery packs. The preset rule is voltage differences between the battery packs in a same charging priority being less than a preset value and the voltage of the battery pack in a low charging priority being higher than that of the battery pack in a high charging priority. The charging control module 150 is configured to control the switching circuit corresponding to the battery pack in the highest charging priority to be turned on to connect a charging loop of the battery pack for charging, and if the voltage of the battery pack currently charged is increased to a value close to the voltage of the battery pack in a next charging priority, control the switching circuit corresponding to the battery pack in the next charging priority to be turned on, so that the battery pack in the next charging priority is connected in parallel to the charging loop for being charged until all the battery packs are connected in parallel to the charging loop for being charged.

In one embodiment, the charging priority determination module includes a sorting unit, a first voltage determination unit, a first voltage range determination unit, a first charging priority setting unit and a first return unit. The sorting unit is configured to sort the battery packs in descending order of their respective voltages. The first voltage determination unit is configured to take the lowest voltage of the battery pack for which no charging priority has been set as a first target voltage. The first voltage range determination unit is configured to obtain a second target voltage according to the first target voltage and the preset value, and obtain a target voltage range according to the first target voltage and the second target voltage. The first charging priority setting unit is configured to set the charging priority of the battery packs whose battery pack voltage is in the target voltage range to a first charging priority, and update the first charging priority. The first charging priority after being updated is lower than the first charge priority prior before being updated. The first return unit is configured to return to the step of taking the lowest voltage of the battery pack for which no charging priority has been set as a first target voltage, until charging priorities are set for all the battery packs.

In one embodiment, the charging priority determination module includes a sorting unit, a second voltage determination unit, a second voltage range determination unit, a second charging priority setting unit and a second return unit. The sorting unit is configured to sort the battery packs in descending order of their respective voltages. The second voltage determination unit is configured to take the highest voltage of the battery pack for which no charging priority has been set as a third target voltage. The second voltage range determination unit is configured to obtain a fourth target voltage according to the third target voltage and the preset value, and obtain a target voltage range according to the third target voltage and the fourth target voltage. The second charging priority setting unit is configured to set the charging priority of the battery pack whose battery pack voltage is in the target voltage range to a second charging priority, and update the second charging priority. The second charging priority after being updated is higher than the second charge priority before being updated. The second return unit is configured to return to the step of taking the lowest voltage of the battery pack for which no charging priority has been set as a third target voltage, until charging priorities are set for all the battery packs.

Specific limitations on the parallelization apparatus of a battery system may be obtained with reference to the limitations on the parallelization method of a battery system hereinabove, which are not described in detail herein. The modules in the parallelization apparatus of a battery system may be implemented entirely or partially by software, hardware, or a combination thereof. The above modules may be built in or independent of a processor of a computer device in a hardware form, or may be stored in a memory of the computer device in a software form, so that the processor invokes and performs operations corresponding to the above modules. It is to be noted that the module division in the embodiments of the present application is an example, and is merely a logical function division, which may be other division in actual implementation.

An embodiment of the present application further provides a computer-readable storage medium, storing a computer program thereon. When the computer program is executed by a processor, steps of the parallelization method of a battery system as described above are performed.

Those of ordinary skill in the art may understand that all or some procedures in the methods in the foregoing embodiments may be implemented by a computer program instructing related hardware, the computer program may be stored in a non-transitory computer-readable storage medium, and when the computer program is executed, the procedures in the foregoing method embodiments may be implemented. Any reference to a memory, a storage, a database, or other media used in the embodiments provided in the present application may include at least one of a non-transitory memory and a transitory memory. The non-transitory memory may include a read-only memory (ROM), a magnetic tape, a floppy disk, a flash memory, an optical memory or the like. The transitory memory may include a random access memory (RAM) or an external high-speed cache memory. By way of illustration and not limitation, the RAM is available in a variety of forms, such as a static RAM (SRAM), a dynamic RAM (DRAM), and the like.

In the description of the specification, reference terms such as "some embodiments", "other embodiments", and "ideal embodiments" mean that a particular feature, structure, material, or characteristic described in connection with the embodiment or example is included in at least one embodiment or example of the present disclosure. In the specification, the schematic expressions to the above terms are not necessarily referring to the same embodiment or example.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present application, and their description is specific and detailed, but cannot therefore be understood as a limitation on the patent scope of the present disclosure. It should be noted that those of ordinary skill in the art may further make variations and improvements without departing from the conception of the present application, and these all fall within the protection scope of the present application. Therefore, the patent protection scope of the present application should be subject to the appended claims.

What is claimed is:

1. A parallelization method of a battery system, wherein the battery system comprises a plurality of battery pack modules, each of the battery pack modules comprises a battery pack and a switching circuit corresponding to the battery pack, the switching circuit is configured to be connected in series between a charging power supply and the battery pack, and the parallelization method comprises:
    acquiring voltages of the battery packs respectively;
    setting a charging priority of each of the battery packs according to a preset rule and the voltages of the battery packs; wherein the preset rule is voltage differences between the battery packs in a same charging priority being less than a preset value and the voltage of the battery pack in a low charging priority being higher than that of the battery pack in a high charging priority; and
    controlling the switching circuit corresponding to the battery pack in the highest charging priority to be turned on to connect a charging loop of the battery pack for charging, and if the voltage of the battery pack currently charged is increased to a value close to the voltage of the battery pack in a next charging priority, controlling the switching circuit corresponding to the battery pack in the next charging priority to be turned on, so that the battery pack in the next charging priority is connected in parallel to the charging loop for being charged until all the battery packs are connected in parallel to the charging loop for being charged;
    wherein setting a charging priority of each of the battery packs according to a preset rule and the voltages of the battery packs comprises:
        S310, sorting the battery packs in descending order of their respective voltages;
        S320, taking the lowest voltage of the battery pack for which no charging priority has been set as a first target voltage;
        S330, obtaining a second target voltage according to the first target voltage and the preset value, and obtaining a target voltage range according to the first target voltage and the second target voltage;
        S340, setting the charging priority of the battery pack whose voltage is in the target voltage range to a first charging priority, and updating the first charging priority, wherein the first charging priority after being update is lower than the first charge priority before being update; and
        repeating S320 to S340, until charging priorities are set for all the battery packs.

2. A non-transitory computer-readable storage medium, storing a computer program thereon, wherein when the computer program is executed by a processor, steps of the parallelization method of a battery system according to claim 1 are performed.

3. A battery system, comprising:
    a plurality of battery pack modules, each of the battery pack modules comprising a battery pack and a switching circuit corresponding to the battery pack, and the switching circuit being configured to be connected in series between a charging power supply and the battery pack; and
    a control apparatus connected to the battery packs and the switching circuits, configured to acquire voltages of the battery packs respectively, configured to set a charging priority of each of the battery packs according to a preset rule and the voltages of the battery packs, and further configured to control the switching circuit corresponding to the battery pack in the highest charging priority to be turned on to connect a charging loop of the battery pack for charging, and if the voltage of the battery pack currently charged is increased to a value close to the voltage of the battery pack in a next charging priority, control the switching circuit corresponding to the battery pack in the next charging priority to be turned on, so that the battery pack in the next charging priority is connected in parallel to the charging loop for being charged until all the battery packs are connected in parallel to the charging loop for being charged; wherein the preset rule is voltage differences between the battery packs in a same charging priority being less than a preset value and the voltage of the battery pack in a low charging priority being higher than that of the battery pack in a high charging priority;

wherein the control apparatus comprises a plurality of battery management systems, the battery management systems are connected through a data bus, the battery management systems are in one-to-one correspondence to the battery pack modules, and each of the battery management systems is configured to acquire the voltage of the corresponding battery pack and control the corresponding switching circuit to be turned on or turned off; and wherein states of the battery management systems comprise a master state and a slave state; wherein when any one of the battery management systems is in the master state, the rest of the battery management systems are in the slave state, and the battery management system in the master state is configured to acquire voltages of the corresponding battery packs fed back by the battery management systems in the slave state, further configured to set a charging priority of each of the battery packs according to a preset rule and the voltages of the battery packs, and configured to control the switching circuit corresponding to the battery pack in the highest charging priority to be turned on to connect a charging loop of the battery pack for charging, and if the voltage of the battery pack currently charged is increased to a value close to the voltage of the battery pack in a next charging priority, control the switching circuit corresponding to the battery pack in the next charging priority to be turned on, so that the battery pack in the next charging priority is connected in parallel to the charging loop for being charged until all the battery packs are connected in parallel to the charging loop for being charged; wherein the preset rule is voltage differences between the battery packs in a same charging priority being less than a preset value and the voltage of the battery pack in a low charging priority being higher than that of the battery pack in a high charging priority.

4. The battery system according to claim 3, wherein each of the battery management systems is provided with a switching port, the battery system further comprises an activation switch, the activation switch is connected in series with the switching ports of the battery management systems, and the activation switch is configured to activate the battery management systems when in a first state.

5. The battery system according to claim 3, wherein the battery management system is configured to transmit its own device code to the rest of the battery management systems through the data bus, and further configured to be in the master state when its own device code is minimum and be in the slave state otherwise.

6. The battery system according to claim 3, wherein the battery management system in the master state is configured to control the charging power supply to stop charging when the voltages of all the battery packs are increased to a preset voltage, so that the battery packs form a discharge loop with an external load through the corresponding switching circuits when the external load is connected.

7. The battery system according to claim 6, wherein the battery management system in the master state is configured to acquire currents of the battery packs respectively when the activation switch is in a second state, determine that the external load has been disconnected when a sum of the currents of the battery packs is less than a first preset current value, and control all the switching circuits to be turned off and all the battery management systems to sleep when an absolute value of the sum of the currents of the battery packs is less than a second preset current value.

8. The battery system according to claim 3, wherein the charging power supply and the battery management systems are connected through the data bus, the charging power supply is configured to transmit an online message to the battery management systems, and the battery management system in the master state, when receiving the online message, determines that the charging power supply is connected.

9. The battery system according to claim 3, wherein the switching circuits are relays.

10. A parallelization apparatus of a battery system, wherein the battery system comprises a plurality of battery pack modules, each of the battery pack modules comprises a battery pack and a switching circuit corresponding to the battery pack, the switching circuit is configured to be connected in series between a charging power supply and the battery pack, and the parallelization apparatus comprises a processor and a memory coupled to the processor and including instructions to cause the processor to perform operations comprising:

acquiring voltages of the battery packs respectively;

setting a charging priority of each of the battery packs according to a preset rule and the voltages of the battery packs; wherein the preset rule is voltage differences between the battery packs in a same charging priority being less than a preset value and the voltage of the battery pack in a low charging priority being higher than that of the battery pack in a high charging priority; and controlling the switching circuit corresponding to the battery pack in the highest charging priority to be turned on to connect a charging loop of the battery pack for charging, and if the voltage of the battery pack currently charged is increased to a value close to the voltage of the battery pack in a next charging priority, control the switching circuit corresponding to the battery pack in the next charging priority to be turned on, so that the battery pack in the next charging priority is connected in parallel to the charging loop for being charged until all the battery packs are connected in parallel to the charging loop for being charged;

wherein setting a charging priority of each of the battery packs according to a preset rule and the voltages of the battery packs comprises:

S310, sorting the battery packs in descending order of their respective voltages;

S320, taking the lowest voltage of the battery pack for which no charging priority has been set as a first target voltage;

S330, obtaining a second target voltage according to the first target voltage and the preset value, and obtaining a target voltage range according to the first target voltage and the second target voltage;

S340, setting the charging priority of the battery pack whose voltage is in the target voltage range to a first charging priority, and updating the first charging priority, wherein the first charging priority after being update is lower than the first charge priority before being update; and repeating S320 to S340, until charging priorities are set for all the battery packs.

* * * * *